United States Patent Office 2,981,321
Patented Apr. 25, 1961

2,981,321

MEANS LIMITING THE RATE OF CHANGE OF FUEL FLOW TO GAS TURBINES

Frank G. Freeman, Solihull, and Eugene H. Warne, Olton, Birmingham, England, assignors to Joseph Lucas (Industries) Limited, Birmingham, England Filed Feb. 8, 1954, Ser. No. 408,964

2 Claims. (Cl. 158—36.4)

This invention relates to means for controlling the supply of liquid fuel to gas turbines, or other engines incorporating a turbine such as certain forms of jet-propulsion engines, and the term gas turbine as used herein is intended to include any such engines.

The object of the invention is to prevent a temporary excess of fuel being supplied during acceleration of the turbine.

Means in accordance with the invention comprise a valve mechanism adapted to control a by-pass, a liquid-operated servo-mechanism or other means for controlling the rate of supply of the fuel, the said valve mechanism being responsive to the opposed actions of a liquid pressure corresponding to the speed of the turbine, and a fuel pressure difference in the fuel supply duct.

Figure 1:
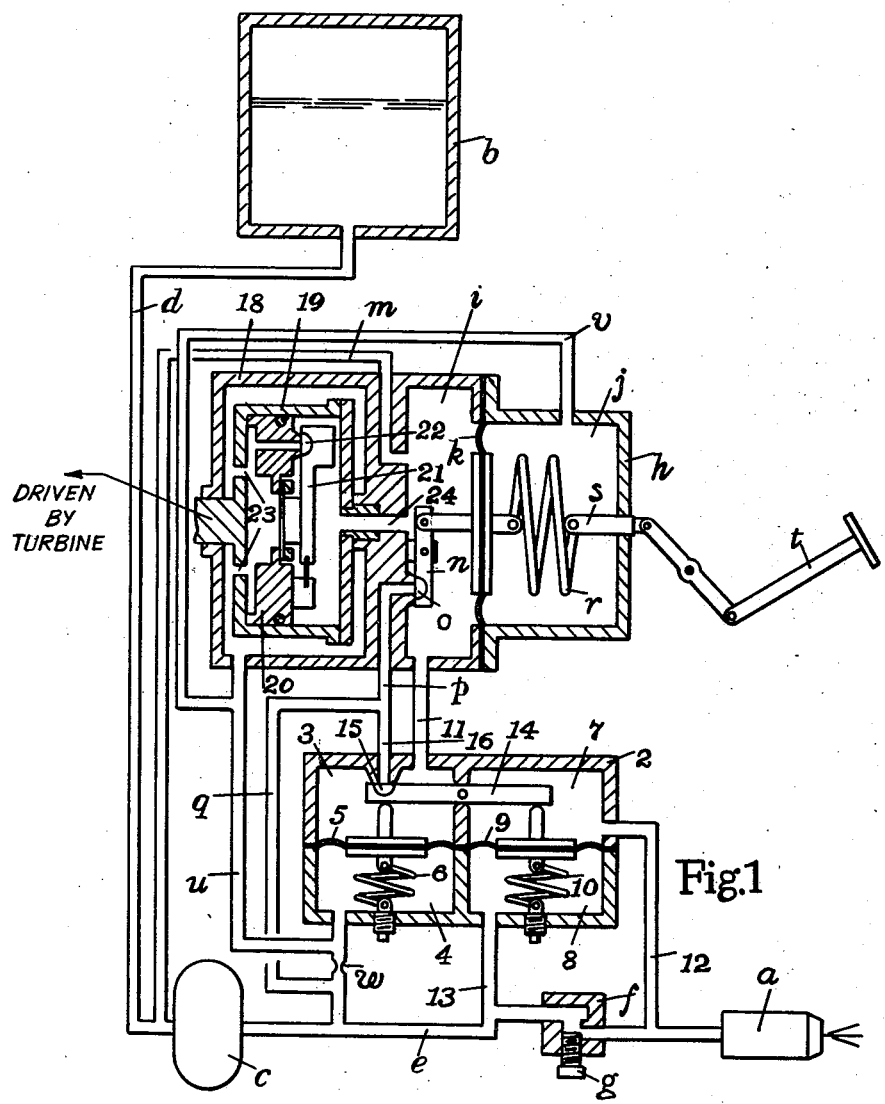
Figure 2:
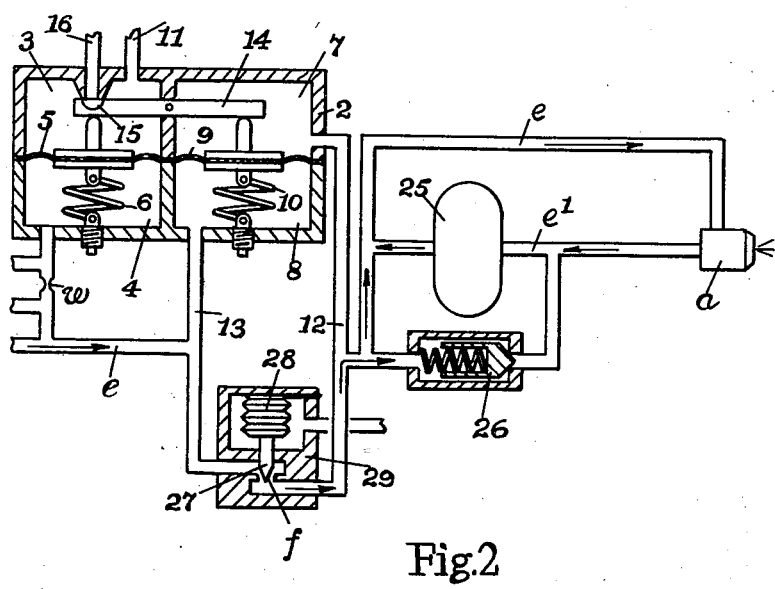

In the accompanying drawings:

Figures 1 and 2 respectively illustrate in diagrammatic form two fuel supply systems embodying the invention.

Referring to Figure 1, the liquid fuel is supplied to a burner nozzle $a$ from a supply tank $b$ by a pump $c$, the latter being driven by the engine or other convenient power source. The pump is supplied from the tank by a pipe $d$, and fuel is conveyed from the pump to the nozzle by a pipe $e$ which includes a restricted orifice $f$, the latter (in the example shown) being variable by an adjustable plug $g$.

There is also provided a chambered body part $h$ which is divided into two compartments $i$, $j$ by a flexible diaphragm $k$. In the compartment $i$, which communicates with the above mentioned pipe $d$ by way of a pipe $m$, is contained a lever $n$ which is connected to the diaphragm and which carries a valve $o$, the latter serving to control a by-pass passage $p$ connected by a pipe $q$ to the above mentioned pipe $e$.

The other compartment $j$ contains a tension spring $r$ which is attached to the diaphragm and to a rod $s$, the latter being connected to a pedal $t$ or other means operable by the driver. Fuel is admitted to this compartment by way of pipes $u$, $v$ at a pressure corresponding to the speed of the turbine, the pipe $u$ being connected to the pipe $e$ through a restricted orifice $w$. One example of means for determining the liquid pressure in the pipe $u$ and hence in the compartment $j$ will be described later.

So far as the above described mechanism is concerned, the arrangement is such that the force acting on the valve lever $n$ at any given time is the algebraic sum of the variable force exerted by the spring $r$ and the variable force exerted by the liquid in the compartment $j$. Assuming the valve $o$ to be closed, then with a given tension in the spring $r$, a given liquid pressure in $j$ can effect opening of the valve. To accelerate the turbine, the driver increases the tension of the spring, so closing the valve, and thereby necessitating a higher fuel pressure (corresponding to a higher speed) to effect re-opening of the valve. It will be understood that opening of the valve has the effect of reducing the rate of flow of fuel to the nozzle $a$.

In co-operative relation with the mechanism above described there is provided another valve mechanism which forms the essential feature of the present invention. This mechanism comprises a pair of chambers in a single hollow body part 2 (or two separate body parts). One of the chambers is divided into two compartments 3, 4 by a diaphragm 5 loaded by a spring 6. The other chamber is divided into two compartments 7, 8 by a diaphragm 9 loaded by a spring 10. The compartment 3 communicates with the pipe $d$ by way of the pipe 11, the above mentioned compartment $i$ of the first described mechanism, and the pipe $m$. The compartment 4 communicates with the pipe $u$ at the discharge side of the restricted orifice $w$, and receives liquid at the pressure related to the turbine speed. The compartments 7, 8 receive liquid fuel by way of pipes 12, 13 at pressures equal to those existing at the outlet and inlet sides of the restricted orifice $f$. The two diaphragms 5, 9 operate on a lever 14, and the part of the lever in the compartment 3 carries a valve 15 which controls a pipe 16 leading to the above mentioned passage $p$.

The valve 15 is normally closed, and the lever is subject at its ends to the oppositely-acting liquid forces. One of these forces (which tends to close the valve) is that which acts on the diaphragm 5 and is related to turbine speed. The other force (which tends to open the valve) acts on the diaphragm 9 and is that which is due to the difference of fuel pressure at opposite sides of the restricted orifice $f$. This valve serves to control flow of liquid from the pipes $e$, $q$ and 16 to the pipe 11, and thence through the above mentioned chamber $i$ to the pipes $m$ and $d$.

The relationship between the two valve mechanisms above described is such that when the driver acts on the pedal $t$ for accelerating the speed of the turbine, the valve $o$ is thereby closed, and the resulting increased flow of fuel in the pipe $e$ to the nozzle $a$ produces an increased pressure difference acting on the diaphragm 9. The effect of this is to open the valve 15, so causing a temporary partial reduction of the increased rate of fuel supply to the nozzle $a$. With increasing speed of the turbine, the pressure of the liquid acting on the diaphragm 5 rises and eventually re-closes the valve 15.

The supply of liquid related to turbine speed may be provided by any suitable means, and one example is illustrated at the upper left hand side of the Figure 1. This comprises a chamber 18 in which is contained a hollow rotor 19 driven by the turbine. The rotor is divided into two compartments by a partition 20. On the rotor is mounted a lever 21 which carries a valve 22, the latter being movable by centrifugal force acting on the lever in the direction for closing the valve. Fuel is supplied to the chamber 18 by the pipe $u$, and from this chamber it can flow into one of the compartments of the rotor through ports 23. From this compartment the liquid can pass under the control of the valve 22 to the other compartment and thence along an axial passage 24 to the chamber $i$, the pipe $m$ and pipe $d$. Normally the valve 22 is open, and with increasing speed it gradually closes so increasing the pressure in the pipe $u$, the pressure in this pipe being consequently always related to the speed of the turbine.

Referring now to Figure 2, this illustrates a system which differs from that shown in Figure 1, in that the fuel pump, referred to as $c$ in Figure 1, is adapted to supply fuel to the nozzle $a$ in excess of that required under low-load conditions, the excess serving to ensure in known manner efficient swirling of the fuel in the swirl chamber of the nozzle, and thereby effect the required atomisation of the fuel emerging from the nozzle, the excess being returned from the swirl chamber of the nozzle to the pipe e by a by-pass pipe $e^1$ which includes a re-circulating pump 25. If desired the pump may have combined with it a pressure-relief valve 26 arranged as shown.

The arrangement shown in Figure 2 also illustrates an alternative to the variable orifice f shown in Figure 1, this alternative being also applicable to the arrangement shown in Figure 1. Instead of varying the orifice by an adjustable plug as shown in Figure 1, it is variable automatically by a slidable plug 27 responsive to barometric pressure acting on a capsule 28 contained in a chamber 29.

In the arrangements above described the liquid whose pressure is related to turbine speed is the liquid fuel, drawn from the pipe e. But this is not an essential feature, as alternatively any other liquid whose sole function is to act in the compartments 4, j above mentioned may be employed, this liquid being supplied from any convenient source at a pressure related to turbine speed.

Further the invention is not limited to the particular mechanical details above described, as these may be varied to suit different requirements. Thus, for example, instead of any or all of the various diaphragms mentioned, pistons slidable in cylindrical chambers may be used.

Having thus described my invention what I claim as new and desire to secure by Letters Patent is:

1. Means for preventing the supply of an excess of liquid fuel to an engine consisting at least in part of a gas turbine, comprising in combination a liquid fuel supply duct for conducting liquid fuel to the engine, a restriction in said duct for creating a fuel pressure difference therein, means forming a region of low pressure relatively to the fuel pressures in said duct, a by-pass leading from a part of said duct at the upstream side of said restriction to said region of low pressure, a valve arranged between said by-pass and low pressure region to serve, when opened, for permitting fuel flow from said duct through said by-pass, a lever for actuating said valve, a first pressure-responsive member arranged to exert pressure on said lever in the direction for closing said valve, a second pressure-responsive member arranged to exert pressure on said lever in the direction for opening said valve, means for subjecting said lever through said first pressure-responsive member to a liquid pressure related to and variable with the speed of the engine, and means for subjecting said second pressure-responsive member at opposite sides respectively to the fuel pressures in said duct at the upstream and downstream sides of said restriction, so that increase in fuel flow through said duct is accompanied by an increase in the difference between the fuel pressures acting on opposite sides of said second pressure-responsive member, and thereby causes opening movement of said valve, if the latter is permitted to open by said first pressure-responsive member, in order to reduce said increase of fuel flow until said valve is reclosed by increase of the liquid pressure acting on said first pressure-responsive member.

2. Means for preventing the supply of an excess of liquid fuel to an engine consisting at least in part of a gas turbine, comprising in combination a liquid fuel supply duct for conducting liquid fuel to the engine, a restriction in said duct for creating a fuel pressure difference therein, means forming a region of low pressure relatively to the fuel pressures in said duct, a by-pass leading from a part of said duct at the upstream side of said restriction to said region of low pressure, a valve arranged between said by-pass and low pressure region to serve, when opened, for permitting fuel flow from said duct through said by-pass, a lever for actuating said valve, a first pressure-responsive member arranged to exert pressure on said lever in the direction for closing said valve, a second pressure-responsive member arranged to exert pressure on said lever in the direction for opening said valve, means for subjecting said lever through said first pressure-responsive member to a liquid pressure related to and variable with the speed of the engine, and means for subjecting said second pressure-responsive member at opposite sides respectively to the fuel pressures in said duct at the upstream and downstream sides of said restriction, so that increase in fuel flow through said duct is accompanied by an increase in the difference between the fuel pressures acting on opposite sides of said second pressure-responsive member, and thereby causes opening movement of said valve, if the latter is permitted to open by said first pressure-responsive member, in order to reduce said increase of fuel flow until said valve is reclosed by increase of the liquid pressure acting on said first pressure-responsive member, and including in combination a second valve also arranged between the by-pass and the low pressure region to serve, when opened, for permitting fuel flow from said duct through said by-pass, a manually stressable spring connected to said second valve for urging the latter into its closed position, a third pressure-responsive member also connected to said valve, and means for subjecting said third pressure-responsive member, in the direction for opening said second valve, to the liquid pressure acting on the first pressure-responsive member.

References Cited in the file of this patent

UNITED STATES PATENTS

| | | |
|---|---|---|
| 2,414,322 | Mock | Jan. 14, 1947 |
| 2,581,275 | Mock | Jan. 1, 1952 |
| 2,590,853 | Fulton | Apr. 1, 1952 |
| 2,599,507 | Wyckoff | June 3, 1952 |
| 2,605,709 | Jubb | Aug. 5, 1952 |
| 2,619,163 | Wynne et al. | Nov. 25, 1952 |
| 2,638,742 | Carey | May 19, 1953 |
| 2,703,961 | Harding | Mar. 15, 1955 |